United States Patent [19]

Noguchi

[11] Patent Number: 5,564,879
[45] Date of Patent: Oct. 15, 1996

[54] THREE-DIMENSIONAL WAREHOUSE

[75] Inventor: Hirokazu Noguchi, Tokyo-To, Japan

[73] Assignee: Wing Labo Co., Ltd., Japan

[21] Appl. No.: 598,075

[22] Filed: Feb. 7, 1996

Related U.S. Application Data

[63] Continuation of Ser. No. 11,521, Jan. 29, 1993, abandoned.

[30] Foreign Application Priority Data

Jan. 31, 1992 [JP] Japan ..................... 4-016974

[51] Int. Cl.⁶ .................................................. B65G 1/04
[52] U.S. Cl. .............................. 414/268; 209/1; 198/348;
414/331; 414/273; 414/277; 414/281; 414/285;
364/470.11
[58] Field of Search ........................... 198/348; 414/331,
414/266, 261, 267, 268, 227, 273, 274,
276, 277, 278, 280, 281, 285, 286, 287;
209/222, 1; 364/478

[56] References Cited

U.S. PATENT DOCUMENTS

| | | | |
|---|---|---|---|
| 3,513,992 | 5/1970 | Handler | 414/263 X |
| 3,613,910 | 10/1971 | Weir | 414/285 X |
| 3,796,327 | 3/1974 | Meyer et al. | 414/273 X |
| 4,232,988 | 11/1980 | Kochanneck | 414/273 X |
| 4,527,937 | 7/1985 | Tomasello, Jr. | 414/273 |
| 5,125,782 | 6/1992 | Goldschmidt | 414/285 X |

FOREIGN PATENT DOCUMENTS

| | | | |
|---|---|---|---|
| 157733 | 7/1954 | Australia | 414/261 |
| 503359 | 12/1954 | Italy | 414/261 |
| 44978 | 4/1977 | Japan | 414/266 |
| 27804 | 2/1986 | Japan | 414/285 |
| 81317 | 4/1986 | Japan | 414/331 |
| 222901 | 9/1987 | Japan | 414/331 |
| 66003 | 3/1988 | Japan | 414/273 |

*Primary Examiner*—Frank E. Werner
*Attorney, Agent, or Firm*—Beveridge, DeGrandi, Weilacher & Young, L.L.P.

[57] ABSTRACT

A three-dimensional warehouse in which its working efficiency is improved with respect to the receiving and taking out of articles and its housing efficiency is improved. The warehouse has entrance/delivery stations provided at a plurality of stories, for housing blocks provided on a vertical plane. The warehouse also has horizontal conveyors disposed to circulate along the periphery of a housing area by connecting the horizontal conveyor of the same story. The warehouse may further include a vertical conveyor for connecting the horizontal conveyors in the vertical direction. The articles can be taken in and out efficiently by driving and selecting the conveyor and the entrance/delivery stations to be used.

16 Claims, 8 Drawing Sheets

THREE-DIMENSIONAL WAREHOUSE

This application is a continuation of application Ser. No. 08/011,521, filed on Jan. 29, 1993, now abandoned which application is entirely incorporated herein by reference.

BACKGROUND OF THE INVENTION

1. Field of the Invention

The present invention relates generally to a three-dimensional warehouse for warehousing articles and is, more particularly, suitable for a large-scale warehouse for dealing with a good deal of various commercial goods.

In a conventional 3-D warehouse, housing articles such as commercial goods, etc. are housed in storage blocks (racks) provided on a vertical plane. FIG. 18 partially illustrates one example of the conventional 3-D warehouse described above. Shown is a stacker crane having an elevator 4 vertically movable along a perpendicular rail 3 provided on a stage 1 movable on a rail 2 through which entrance/delivery stations A, B are connected. This elevator is, as will be mentioned later, equipped with a fork or the like (not shown) required for transferring the articles. Conveyors (not shown) for conveying pallets loaded with article cases are laid in the vicinities of the stations A, B. For instance, fifty pieces of corrugated paper boxes as one unit are loaded on the pallet and then conveyed.

In the three-dimensional (3-D) warehouse described above, when the pallet reaches the entrance station via the conveyor, the pallet is shifted onto the station from the conveyor. Subsequently, an empty pallet rack position for taking in the goods is designated by a control unit. Then, the stacker crane moves to the entrance station from the entrance rack position of the last time. (Generally, a standby state implies that the crane remains in the station position till the next indication is given in the case of taking in the goods.) The transfer of the designated pallet from the station to the stacker crane is completed in a position of the entrance station by means of the fork installed in the stacker crane. Then, this stacker crane moves to the designated empty pallet rack position, where the pallet is retransferred in the pallet rack by the fork of the stacker crane. A control computer is thereby informed of the fact that this pallet rack has been housed in the indicated position. As explained above, the stacker crane goes back to the position of the entrance station and waits there. Such operations are repeated.

In the case of this example, a moving range of the stacker crane is defined by points A, E, F, B, wherein the points E, F are set above the points A, B. Further, the pallet racks are provided on both surfaces or one surface of this plane AEFB.

The articles, which are thus taken out, form groups of the same articles according to an order unit. Cases of the same articles are grouped by use of a device called a case flow rack (not shown) and thereafter sorted by a device known as a sorter.

FIG. 19 shows one example of a conventional bring-in conveyor to the sorter. Sorting chutes 6a–6n having inclined surfaces are arrayed on both sides of the rectilinear conveyor 5. Each chute is allocated to a specified article. The articles are distributed to desired positions by removing a stopper, provided corresponding to a moving position of the conveyor 5, for stopping a drop.

FIG. 20 illustrates conveyors for conveying the articles distributed from the sorter shown in FIG. 19 towards a discharge port. Laid on both sides of the chute are two lines of carrier conveyors 7a, 7b and discharge conveyors 8a, 8b connected thereto. The articles are taken out of the tip parts thereof.

The delivery operation has hitherto been performed in the following manner.

To start with, when designating a delivery pallet rack position, a stacker crane accessible thereto is designated and then moved. The stacker crane comes to the designated position, and the fork of the stacker crane stretches to take out the pallet loaded with the articles from the pallet rack and transfer them onto the stacker crane. The pallet is returned to the station position by the stacker crane, wherein the pallet is placed on a conveyor for unstacking the articles. The group of article cases on the pallet are separated on the unit of article case by a case flow rack provided in a place to which the conveyor runs. Next, the articles designated by the sorter are taken out, and the articles are grouped based on a delivery request. The thus grouped articles are palletized once again to group a designated number (e.g., 50 pieces) of articles in a delivery berth and then delivered. A delivery form in this case may be configured based on the same articles or plural kinds of articles.

In this type of conventional 3-D warehouse, the number of the entrance/delivery stations is 2 at most for one stacker crane. Further, a function of the station is fixed. A lay-out of the warehouse is determined in terms of a single significance, and hence a degree of freedom in design is poor. For instance, when the stations are common to the entrance and delivery of the articles, the entrance/delivery operations eventually have to be performed separately in terms of time for preventing a confusion in operation. For this reason, the stacker crane returning from the delivery station during the delivery operation is invariably empty. The stacker crane going to the entrance station from the pallet rack during the entering operation is invariably empty. This results in such a problem that a stacking efficiency is low.

Further, the entrance/delivery stations are generally provided at the lowermost portion. It therefore takes much time for taking in and out the articles with respect to the blocks remote from the entrance/delivery stations, viz., the upper blocks in general. For this reason, the remote blocks, e.g., the blocks closer to points E and F in FIG. 18, are not available. There arises a problem in which a using efficiency declines. It is required that running and vertical movements of the stacker cranes be effected by use of powerful driving means in order to quickly transfer the articles to such remote blocks. A problem is also caused, wherein this brings about an increase in the price of equipment.

Moreover, the quick delivery of the articles is highly demanded in so-called seasonal goods such as foodstuffs and home electric products. A quicker and higher efficiency physical distribution management is desired. The conventional 3-D warehouses do not necessarily satisfy such a demand.

Besides, when the bring-in conveyor to the sorter is single as in the prior art, the feeding way is fixed. Hence, if the articles do not drop as expected, this conduces to such a problem that the articles are jammed at the terminal of the conveyor and have to be removed by human hands.

Furthermore, in spite of the fact that sorting ports are disposed on both sides of the conveyor in a conventional sorter structure, there is prepared a single line of the bring-in conveyor. Hence, this leads to a problem in which it takes a considerable time for a movement to the sorting port, and the working efficiency is poor. Besides, the conveyor running from the sorter to the discharge port is fixed in its conveying direction, there-by by causing a problem of making the working efficiency poor.

SUMMARY OF THE INVENTION

It is a primary object of the present invention to provide a three-dimensional warehouse capable of reducing access time to a storage block and efficiently employing the storage block.

It is another object of the present invention to provide a three-dimensional warehouse having a sorter structure and a discharge structure which can be efficiently operated.

According to a first aspect of the present invention, there is provided a three-dimensional warehouse comprising:

a plurality of racks having article housing blocks arranged in a matrix on a vertical plane and disposed in parallel; and article delivering means for taking in and out articles with respect to said designated housing block of said rack and conveying the articles between access ports provided at a plurality of stories.

According to a second aspect of the present invention, there is provided a three-dimensional warehouse comprising:

a plurality of racks having article housing blocks arranged in a matrix on a vertical plane and disposed in parallel;

article delivering means for taking in and out articles with respect to said designated housing block of said rack and conveying the articles between access ports provided at a plurality of stories;

horizontal conveying means, disposed to circulate along the periphery of said rack installation area, for connecting said access ports existing at the same stories among said access ports provided at a plurality of stories; and vertical direction transferring means for connecting said horizontal conveying means in the vertical direction.

According to a third aspect of the present invention, there is further provided a three-dimensional warehouse comprising:

a housing section including: a plurality of racks having article housing blocks arranged in a matrix on a vertical plane and disposed in parallel; and article delivering means for taking in and out the articles with respect to said designated housing block and conveying the articles between access ports;

a sorting section for sorting the articles taken out of said housing section; and conveying routes, configured as multiplex circulating routes, for conveying the articles from said housing section to said sorting section.

According to a fourth aspect of the present invention, there is provided a three dimensional warehouse comprising:

a housing section including: a plurality of racks having article housing blocks arranged in matrix on a vertical plane and disposed in parallel; and article delivering means for taking in and out the articles with respect to said designated housing block and conveying the articles between access ports;

a sorting section for sorting the articles taken out of said housing section; and a discharge conveying route, constituting a circulating route having a return route from a discharge point to said sorting section, for discharging the articles sorted by said sorting section.

In the 3-D warehouse according to the present invention, access ports are provided at a plurality of stories and thus the invention is multi-storied. It is therefore feasible to select an optimum entrance/delivery station in accordance with a housing position of the articles to be taken in and out. Hence, a moving distance of the pallet crane may be small, and the time of access to the housing block positioned away from the conventional entrance/delivery station can be reduced. The efficiency of utilization is thereby improved.

Additionally, since the 3-D warehouse includes: horizontal conveying means, disposed to circulate along the periphery of a rack installation area, for connecting access ports existing at the same story among the access ports provided at the plurality of stories; and a vertical direction transferring section for connecting these horizontal conveying means in the vertical direction, a degree of freedom of allocating the entrance/delivery stations and the conveying routes in accordance with the sorts and housing positions of the articles is markedly improved and therefore the operations in the warehouse can be performed at a much higher efficiency.

BRIEF DESCRIPTION OF THE DRAWINGS

Other objects and advantages of the present invention will become apparent during the following discussion taken in conjunction with the accompanying drawings, in which.

DESCRIPTION OF THE PREFERRED EMBODIMENTS

Figure 1:
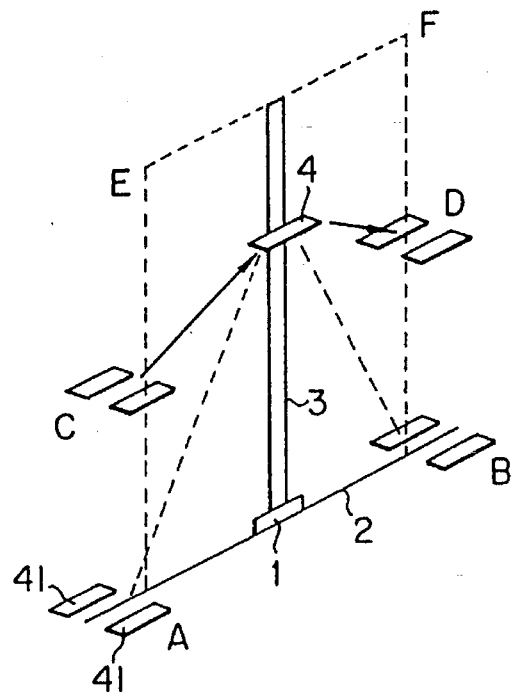
FIG. 1 is a perspective view schematically illustrating how the entrance/delivery stations employed in a three-dimensional warehouse according to the present invention are multiplexed.

FIG. 1 is a plan view illustrating a partial construction of a three-dimensional (3-D) warehouse in one embodiment of the present invention. In accordance with this embodiment, there is shown, as similar to a conventional 3-D warehouse, a stacker crane having an elevator vertically movable along a perpendicular rail provided on a stage 1 movable on a rail 2 through which entrance/delivery stations A, B are connected. Further, different entrance/delivery stations C, D are disposed upwardly of the entrance/delivery stations A, B.

Conveyors (unillustrated) for conveying pallets loaded with goods are laid in the vicinities of these stations A, B, C, D.

In such a 3-D warehouse, the stations are multi-storied, whereby access ports corresponding to the number of stories can be formed in the same plane positions. With this arrangement, the station existing in a higher position is usable for a pallet rack in a higher position. Movements of the crane in the vertical directions with the entrance and delivery of the articles are reduced, thereby improving working efficiency. Concomitantly, in a moving range of the stacker crane, the crane is usable up to the top maximum points E, F above the points A, B. Hence, using frequencies of all the pallet racks can be set equal, and the using efficiency can be improved.

Further, a certain story is dedicated to the entrance of the articles, whereas other stories are dedicated to the delivery thereof, thus smoothing the transfer of the articles.

Moreover, even when failing to take in or out the articles, it is possible to effect retrying from some other multi-stories. A working certainty is thereby ameliorated.

Figure 2:
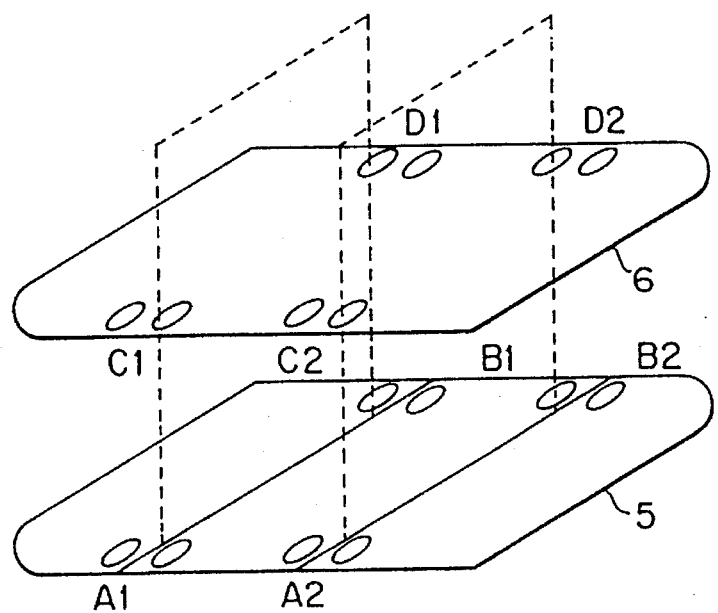
FIG. 2 is a perspective view schematically illustrating how the multiplexed entrance/delivery stations in the 3-D warehouse of this invention are connected through conveyors that circulate.

FIG. 2 is a perspective view showing a second embodiment of the present invention. In this embodiment, the entrance/delivery stations have, as in the same way with the case of FIG. 1, a two-storied structure. The respective stories are equipped with conveyors 5, 6 disposed to circulate along the peripheries of the pallet rack areas. Namely, one or a plurality of conveyors capable of independently controlling the advancing direction are laid along the respective sides to surround the housing area. Incidentally, for simplifying the explanation in this embodiment, two sets of stacker cranes are provided; the lower story includes entrance/delivery stations A1, A2, B1, B2; and the upper story includes stations C1, C2, D1, D2.

Figure 3:
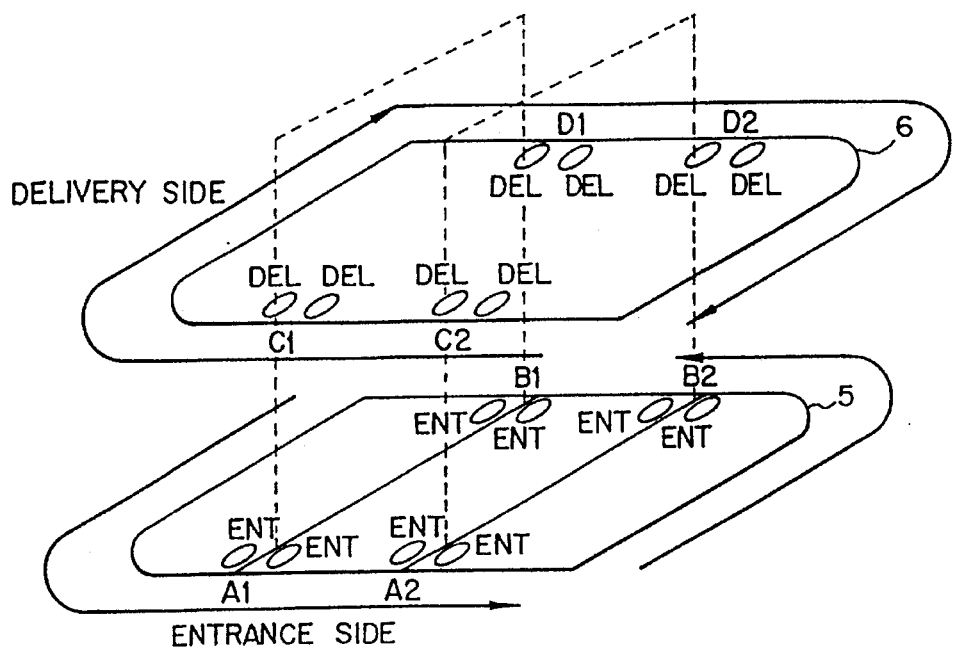
FIG. 3 is a perspective view schematically showing a first example of how conveying directions of the conveyors are set, and the entrance/delivery stations are allocated in the construction illustrated in FIG. 2.
Figure 4:
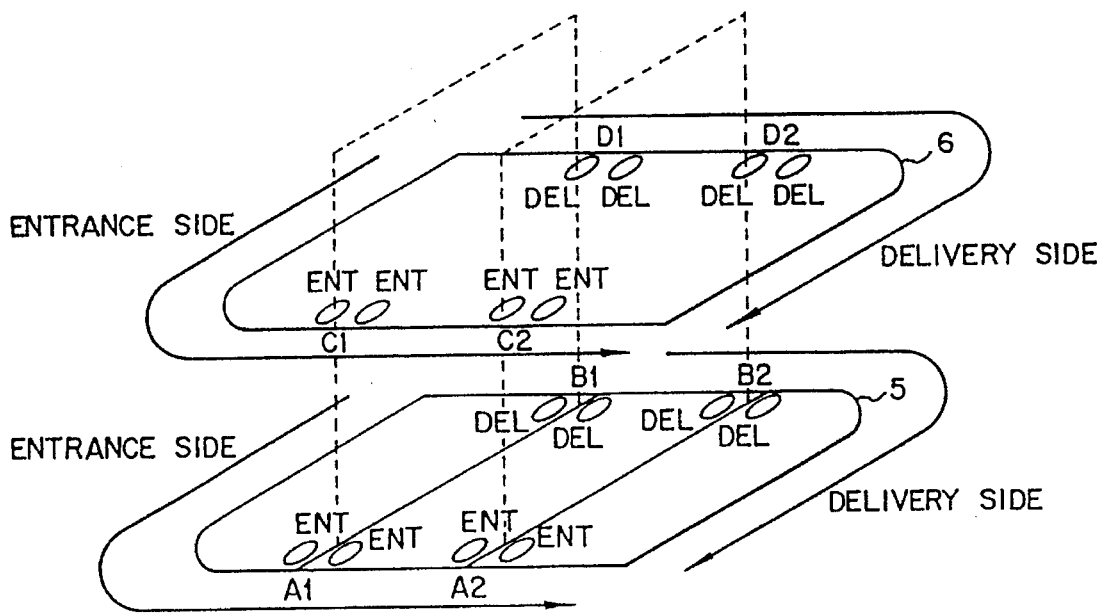
FIG. 4 is a perspective view schematically showing a second example of how the conveying directions of the conveyors are set, and how the entrance/delivery stations are allocated in the construction illustrated in FIG. 2.
Figure 5:
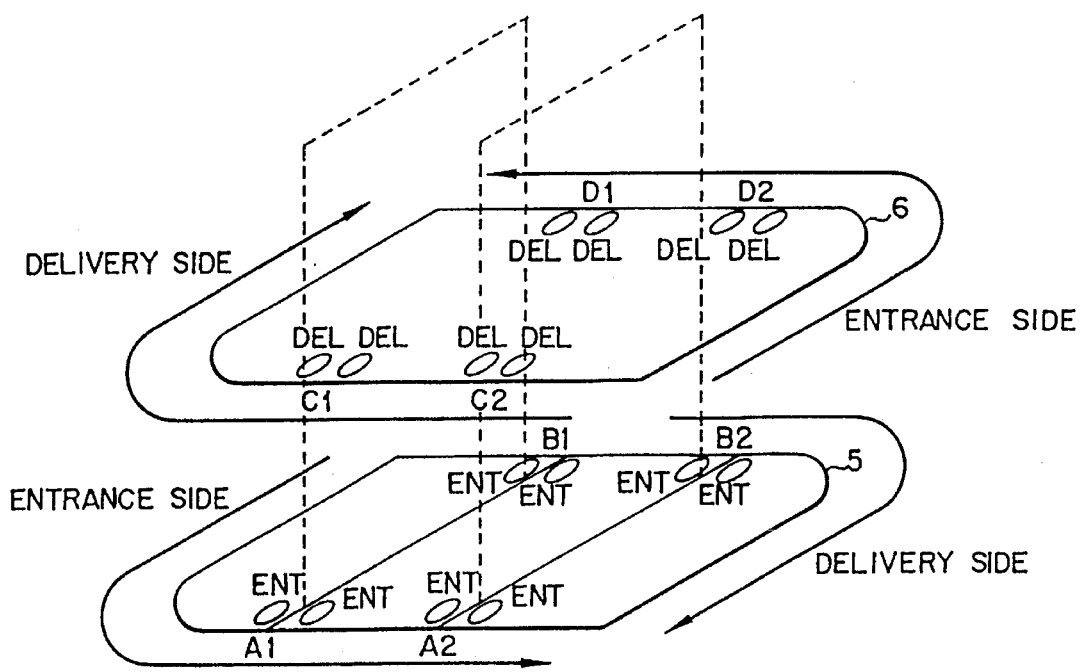
FIG. 5 is a perspective view schematically showing a third example of how the conveying directions of the conveyors are set, and the entrance/delivery stations are allocated in the construction illustrated in FIG. 2.

With this construction, the stations and the conveyors can be freely allocated in accordance with an entrance/delivery mode of the articles. FIGS. 3 through 5 illustrate such examples. Turning to FIG. 3, the stations A1, A2, B1, B2 of the lower story are used exclusively for taking in the articles, while the stations C1, C2, D1, D2 are employed exclusively for taking them out. Further, in FIG. 3, the advancing direction of the conveyor is reversed depending on the upper and lower story.

Referring to FIG. 4, the entrance station is disposed on the front side, while the delivery station is disposed on the rear side. Speaking of the advancing direction of the conveyor in this case, one corner (right corner on the front side in FIG. 4) is a terminal.

FIG. 5 illustrates such a construction that the relation between the entrance position and the delivery position is reversed depending on the upper and lower story, wherein the stations A1, A2, D1, D2 are employed as entrance stations, while stations B1, B2, C1, C2 are used as delivery stations.

Shown in this embodiment is an example where two stacker cranes are provided for simplicity. A structure having three or more stacker cranes may, however, be adopted. Further, the description deals with the entrance/delivery stations that are two-storied (staged) but may adopt a three or more storied structure.

The allocation of such stations and the advancing direction of the conveyor may be fixed but may be adequately varied considering the sorts and numerical quantities of the articles to be taken in and out. It is feasible to reverse the entrance side and the delivery side simply by changing the turning direction of the conveyor that is thus annularly connected, whereby the articles can be taken in and out at a high efficiency. Besides, the article can be conveyed at the shortest distance from the entrance side or to the delivery side by utilizing the conveyor of the story corresponding to the rack position of the article to be taken in and out. Further, even when failing to take in or out the article, it is possible to perform retrying from some other multi-stories, thereby improving the working efficiency. The conveyor running in parallel with the moving direction of the stacker crane is usable as an entrance or delivery sorting conveyor or as a temporary storage conveyor.

Figure 6:
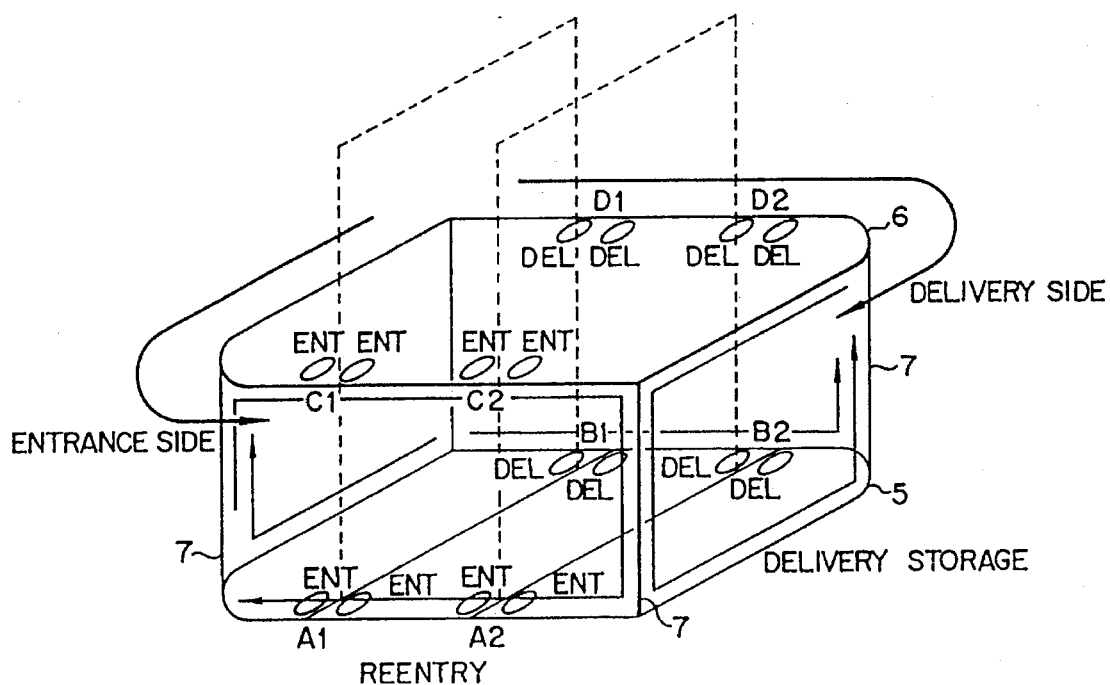
FIG. 6 is a perspective view demonstrating an embodiment wherein the multiplexed conveyors are connected through vertical elevators in the construction illustrated in FIG. 2.

FIG. 6 demonstrates another embodiment of the present invention. Added to the embodiment of FIG. 4 are vertical transferring means 7 (vertical elevators) for connecting the conveyors of the upper and lower stories to the respective corners.

In accordance with this embodiment, the articles can be transferred within not only the same plane but also the vertical plane by combining the vertical elevators with the conveyors. More specifically, referring to FIG. 6, the vertical elevators on the sides of stations A1, C1 are operated upwards, whereas the vertical elevators on the sides of the stations C2, A2 are operated downwards. A flow route directed to A1, C1, C2, A2 is formed. This implies that a story-to-story transfer of the article or a functional inversion of the entrance/delivery operations is attainable, and the flexibility to the allocation of the stations and other increases. Namely, the articles on the conveyor can be sorted both to the conveyor of the entrance line and to the conveyor of the delivery line by means of the vertical elevator. All the conveyor units including the vertical elevators may have turn out access ports. For the same reason, a large proportion of the conveyor sections may have turn out stacking sections. Therefore, a good deal of articles can be three-dimensionally stacked. Further, even when failing to take in or take out the article, it is possible to execute retrying from some other multi-stories by utilizing the vertical elevators without running the stacker crane. The certainty of entrance/delivery operations is improved. A rearrangement for taking in and out the articles can be also effected by properly controlling the vertical elevators and the conveyors.

The following is a way of how the articles are taken in and out when employing the structure shown in FIG. 6.

To begin with, when the pallet loaded with the articles arrives, the data such as a lot number, an item number and a date that are indicated by bar codes are read. a housing area is examined by the control computer. An empty pallet rack position for the entrance of article is designated by making a comparison with an empty state within this housing area. Then, the control unit computes a minimum entrance time by knowing which entrance station to use, which story this station is disposed and what position it exists. The optimum entrance station is thus determined. The conveyor and the vertical elevator are driven so that the pallet reaches there. In this case, it is considered that no influence is exerted on motions of other stacker cranes. When the pallet reaches the designated entrance station, the pallet is shifted onto the station from the conveyor. The control computer is thereby informed of the fact that this pallet has been housed in the designated position. Such operations are repeated.

Next, in the case of the taking out the article, when a delivery pallet rack position is at first designated, the least delivery time is computing by knowing which station to use and which story this station is disposed. A route is determined based on the result thereof. Subsequently, a stacker crane is designated. The stacker crane moves from the present position to the designated pallet rack position. When the stacker crane comes to this designated pallet rack position, the fork stretching from the stacker crane pulls in the pallet loaded with the article from the pallet rack and transfers it onto the stacker crane. The stacker crane mounted with the pallet moves to the designated delivery station where the pallet is shifted onto the station. The pallet goes further to the next sorting step through the conveyor and the vertical elevator. In the sorting step, the designated articles are taken out by the sorter and grouped. The thus grouped articles are palletized again to group a designated number of cases (e.g., 50 cases) in the delivery berth and then delivered.

Figure 7:
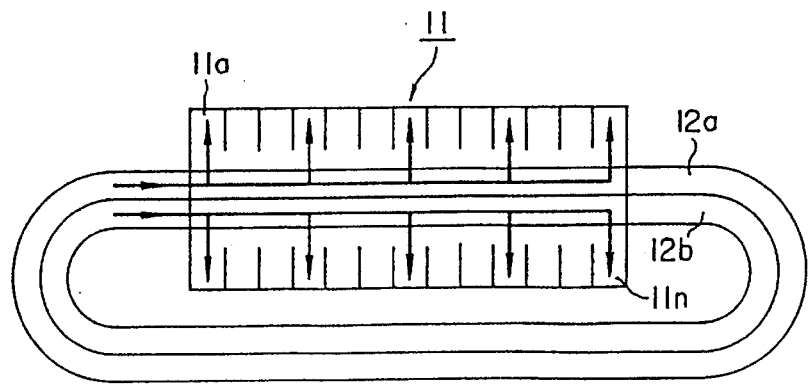
FIG. 7 is a plan view demonstrating an embodiment wherein articles to be sorted are conveyed in multiplexed loops to a sorter section.
Figure 8:
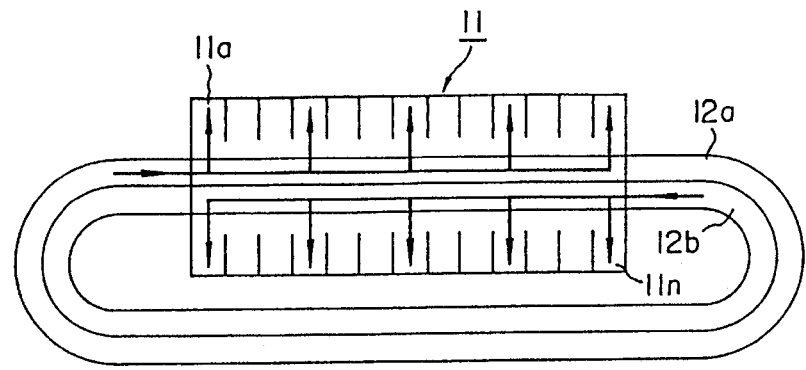
FIG. 8 is a plan view demonstrating an embodiment wherein the articles to be sorted are conveyed in the multiplexed loops to the sorter section.
Figure 9:
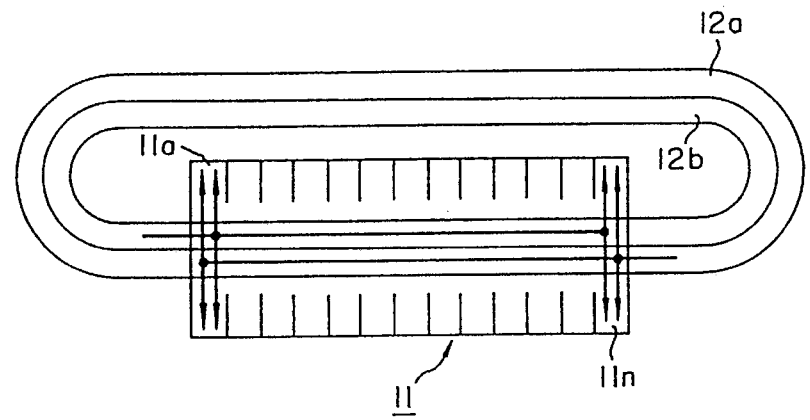
FIG. 9 is a plan view demonstrating an embodiment wherein the articles to be sorted are conveyed in the multiplexed loops to the sorter.

FIGS. 7 to 9 are plan views showing an embodiment in which the conveyors for conveying the articles to a sorter 11 are double-looped. Turning to FIG. 7, the double-looped conveyors 12a, 12b have the same conveying direction. Referring to FIGS. 8 and 9, two lines of the conveyors 12a, 12b have conveying directions opposite to each other. Referring again to FIGS. 7 and 8, the respective chutes of the sorter 11 take out the articles only from the conveyor closer thereto. In the case of FIG. 9, however, the articles can be taken out from the other conveyor as well as from the conveyor closer thereto.

In this type of sorter, an enhancement of the sorting efficiency can be expected by sharing the roles so that rough sorting is assigned to the conveyor, while elaborate sorting is assigned to the sorter. Besides, the conveyors are circulated, and hence even the articles that have failed to be sorted will return again to the sorting position. Retrying can be therefore performed. Further, the conveyor is properly turned in the reversed direction depending on a distribution of the articles on the conveyor, thereby making it possible to effect sorting at the shortest distance.

In accordance with the embodiment discussed above, the circulation is performed in plane along the doubled conveying routes. However, triple or more loops may be configured. Besides, the loops may be three-dimensionally multiplexed.

FIGS. 10 to 16 are plan views illustrating examples of a discharge conveyor unit for discharging the articles sorted by the sorter 11.

Figure 10:
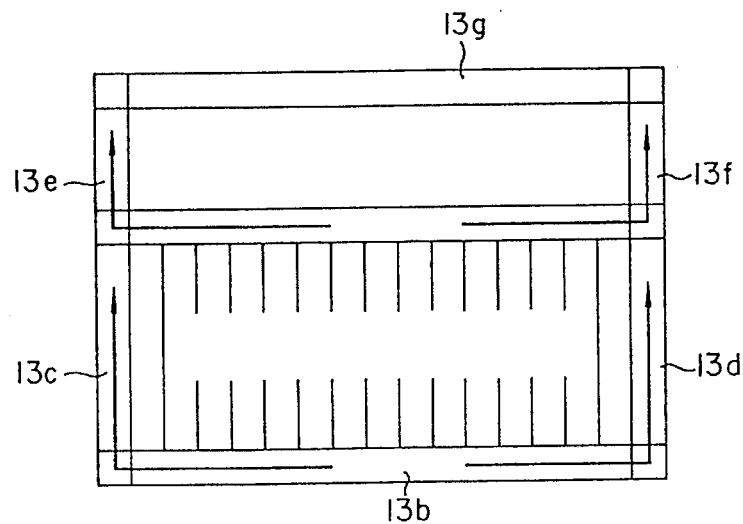
FIG. 10 is a plan view showing the conveying directions of the conveyors in the embodiment wherein the route used for a discharge from the sorter section is looped.

As depicted in FIG. 10, the discharge conveyor unit includes: conveyors 13a, 13b laid along the major sides of the sorter; conveyors 13c, 13d laid along the minor sides thereof; conveyors 13e, 13f laid respectively in extending directions of the conveyors 13c, 13d; and a conveyor 13g provided at the ends of the conveyors 13e, 13f and disposed in parallel with the conveyors 13a, 13b. Further, referring to FIGS. 11 and 12, the conveyors 13a, 13b, 13g are halved at their centers.

This type of discharge conveyor section is capable of exhibiting a large variety of functions by adequately controlling the conveying directions of the respective conveyors.

Figure 11:
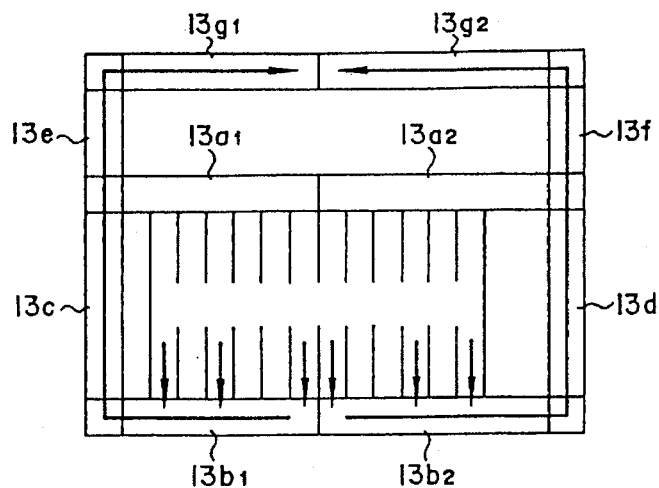
FIG. 11 is a plan view demonstrating an embodiment wherein the route used for the discharge from the sorter section is looped, and the conveyors extending along the longitudinal direction of the sorter are halved.
Figure 12:
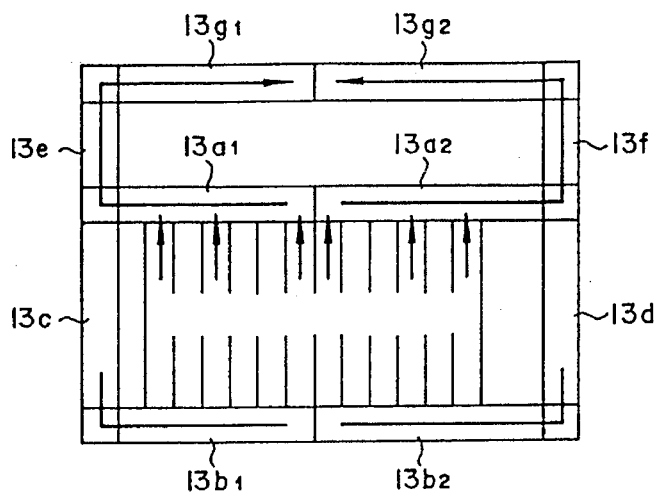
FIG. 12 is a plan view demonstrating an embodiment wherein the route used for the discharge from the sorter section is looped, and the conveyors extending along the longitudinal direction of the sorter are halved.

FIGS. 11 and 12 illustrate situations where the articles sorted by the sorter are conveyed to the central part of the conveyor unit 13. As depicted in FIG. 11, the articles taken out by the lower left half of the sorter are conveyed clockwise by the respective conveyors 13b1, 13c, 13e, 13g1. The articles taken out by the lower right half of the sorter are conveyed counterclockwise by the respective conveyors 13b2, 13d, 13f, 13g2. Similarly, as illustrated in FIG. 12, the articles taken out by the upper left half of the sorter are conveyed clockwise by the respective conveyors 13a1, 13e, 13g1. The articles taken out by the upper right half of the sorter are conveyed counterclockwise by the respective conveyors 13a2, 13f, 13g2.

When such a conveying route is adopted, the moving distance of the conveyor along the major side of the sorter is reduced by a factor of 2, and a difference in the delivery time is therefore small.

Figure 13:
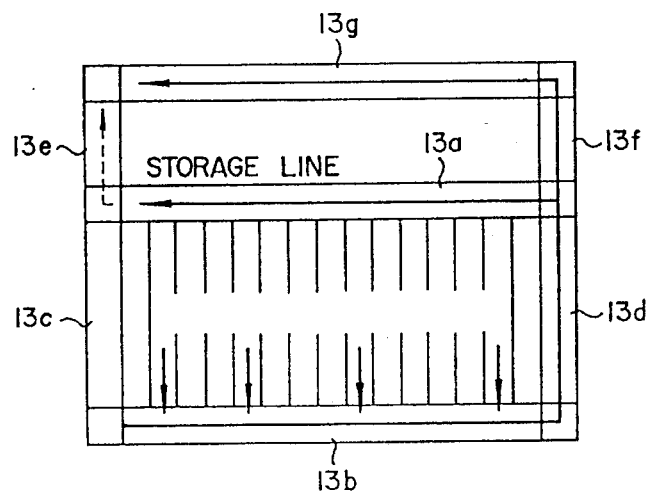
FIG. 13 is a plan view showing an example where a part of the conveyors is employed for stacking.
Figure 14:
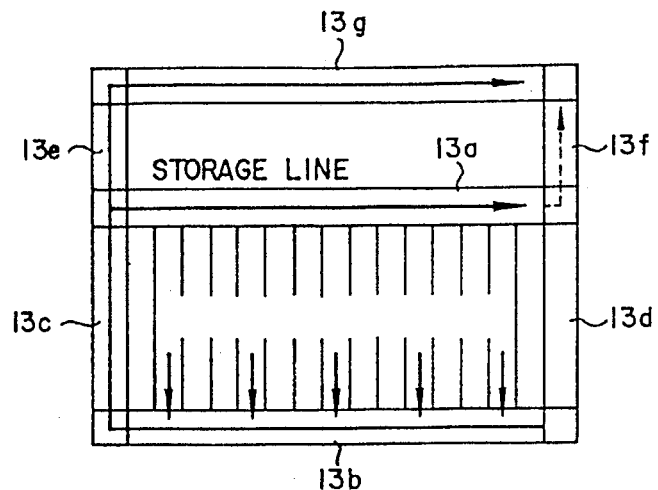
FIG. 14 is a plan view showing an example where a part of the conveyors is employed for stacking.

FIGS. 13 and 14 shows examples where the conveyors unused for discharging are utilized as storage conveyors. To be specific, referring to FIG. 13, the articles are discharged at the lower left end by use of the conveyors 13b, 13d, 13f, 13g. The conveyor 13a unused at this moment serves as a storage line for temporarily storing the articles.

The articles stored are discharged subsequently through the conveyor 13c according to the necessity after being discharged. FIG. 14 illustrates substantially the same arrangement as that shown in FIG. 13, wherein only the conveying direction of the conveyor is different.

Figure 15:
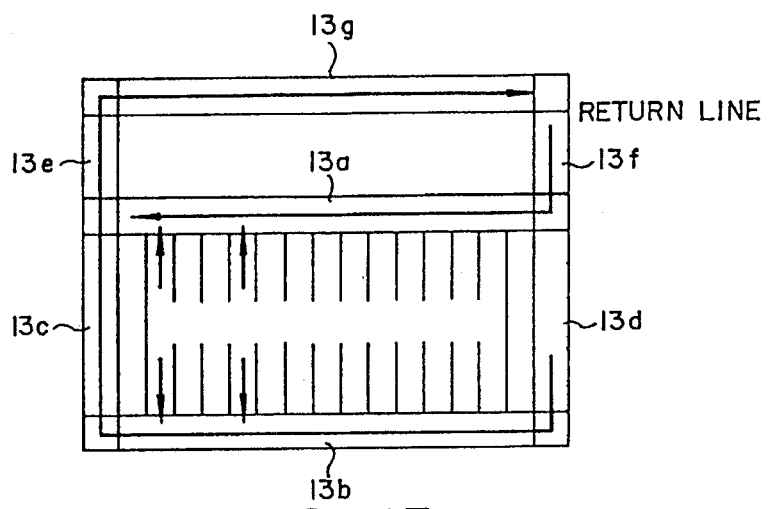
FIG. 15 is a plan view illustrating an example where a part of the conveyors is employed as a return line from a discharge point.
Figure 16:
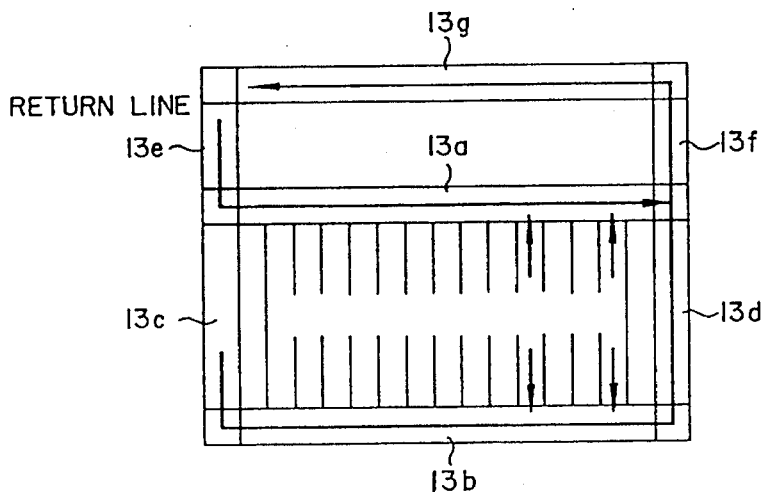
FIG. 16 is a plan view illustrating an example where a part of the conveyors is employed as the return line from the discharge point.

FIGS. 15 and 16 show examples where loop conveyors are configured when only a part of the sorter is employed. That is, in the case of FIG. 15, the articles are discharged via a route consisting of the conveyers 13a, 13e, 13g and a route consisting of the conveyors 13b, 13c, 13e, 13g. However, the conveyor 13f driven downwards from the upper right discharge point constitutes a return line. As a result, a loop is configured by the conveyors 13a, 13e, 13g, 13f. Such a loop is useful when the articles are not discharged at the discharge point at a certain discharge timing but discharged by making them confluent with the next lot. FIG. 16 illustrates almost the same construction except that the conveying direction is different.

Figure 17:
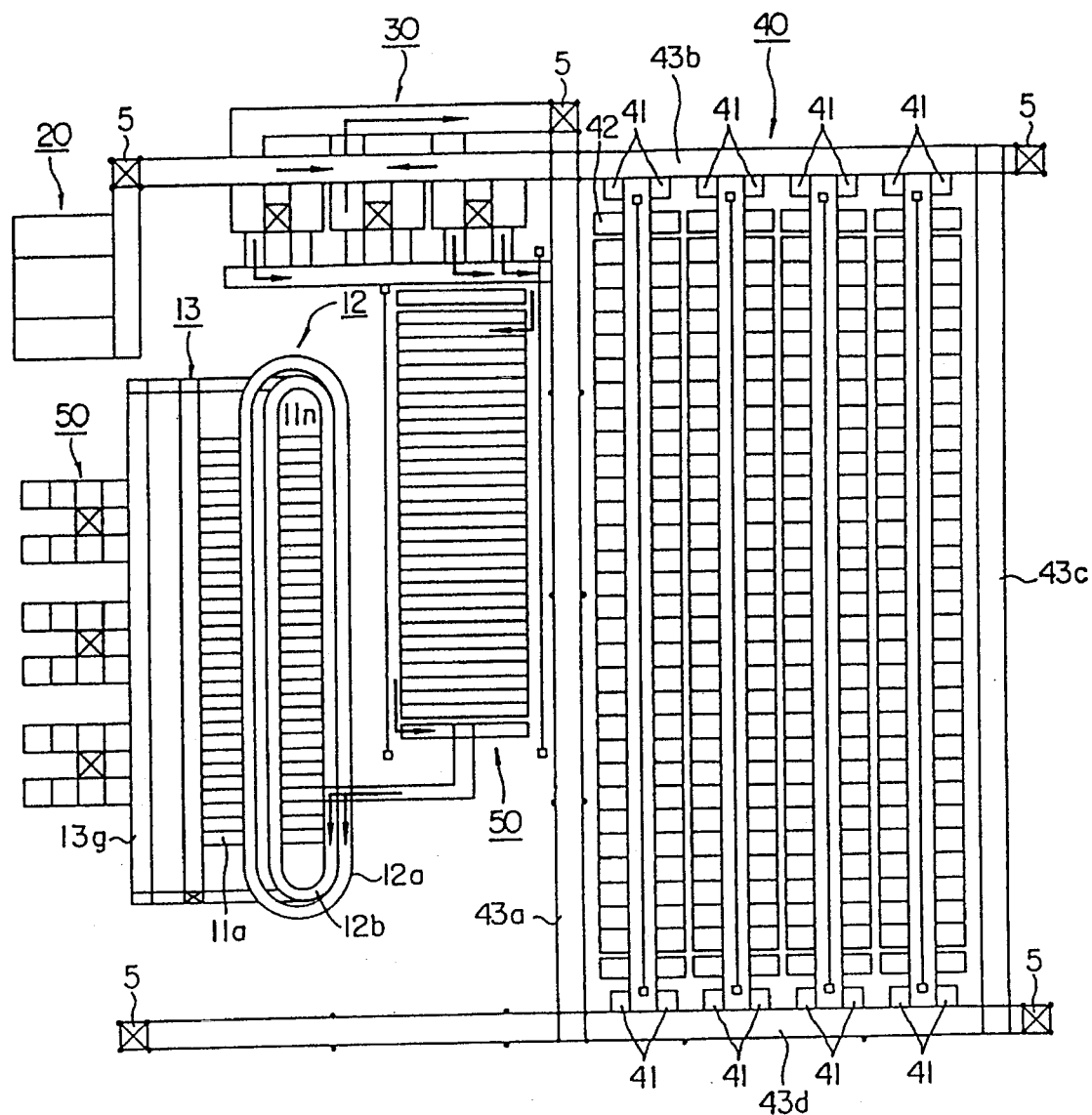
FIG. 17 is a plan view depicting a whole construction of a three-dimensional warehouse to which the present invention is applied.
Figure 18:
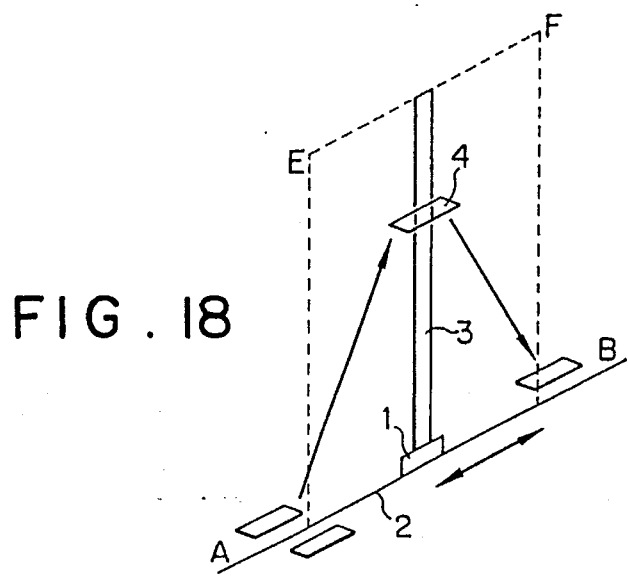
FIG. 18 is a perspective view illustrating a conventional entrance/delivery station fixed and a stacker crane.
Figure 19:
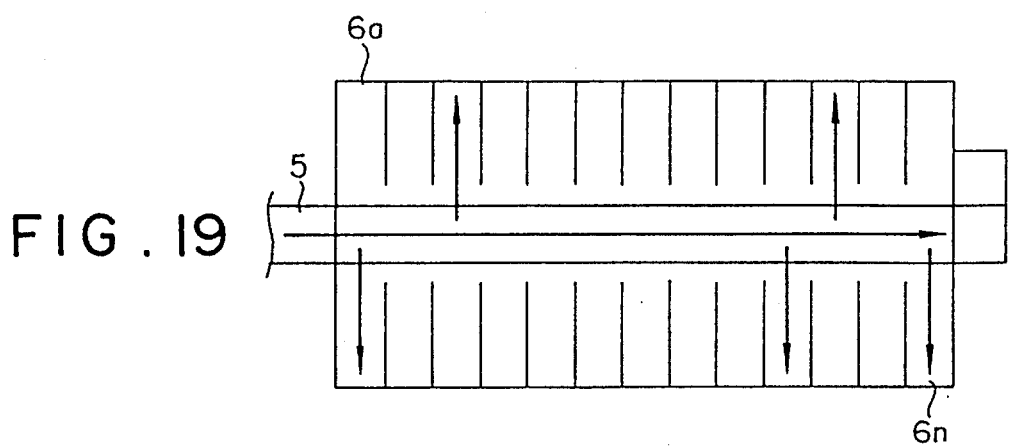
FIG. 19 is a perspective view showing a bring-in route of the articles to be sorted to a conventional sorter.
Figure 20:
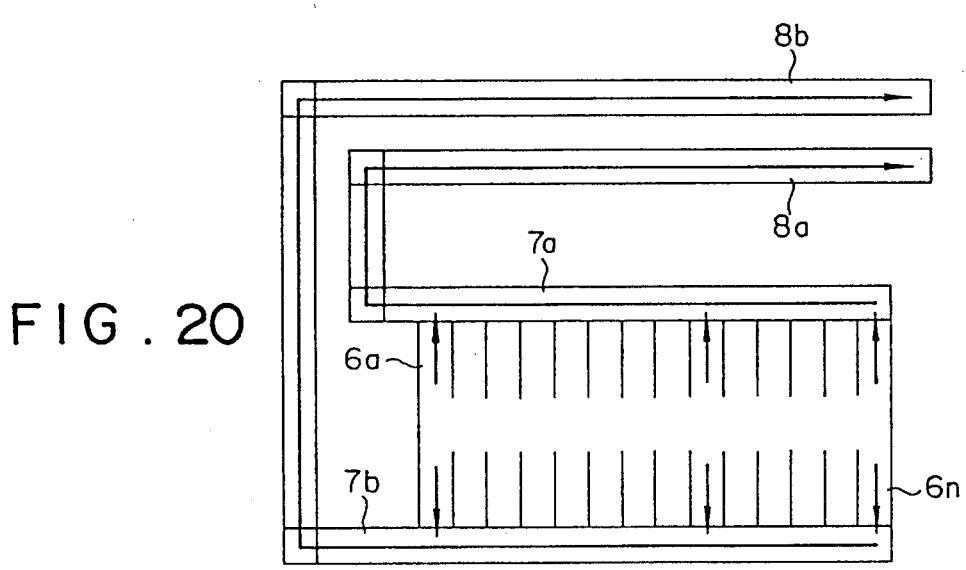
FIG. 20 is a plan view illustrating a discharge route from the conventional sorter.

FIG. 17 is a plan view illustrating one example of a construction of the 3-D warehouse. The 3-D warehouse incorporates all of the multi-storied entrance/delivery stations, the multi-looped sorter and the looped discharge conveyors that are described so far. In this Figure, for simplicity, there are provided four sets of stacker cranes and there is shown a housing section 40 including pallet racks 42 disposed on both sides of the stacker crane. An actual 3-D warehouse is commonly equipped with 20 or more stacker cranes. Besides, conveyors 43a, 43b, 43c, 43d are provided to surround the periphery of the pallet rack area. The conveying directions of these conveyors are freely controllable.

The operation in FIG. 17 will now be explained. The pallet loaded with the article is thrown in from a throw-in section 20. If a position of the designated rack in which the pallet is to be housed is high, the pallet is raised up to the conveyor position of the upper story by means of the vertical elevator 5. The pallet is shifted onto the stacker crane at the station 41 of the housing section 40. The pallet is housed in the designated pallet rack by this stacker crane.

On the other hand, in the case of taking out a certain housed article in accordance with a command given from the control unit, the pallet is shifted onto the stacker crane which has moved to the pallet rack. The pallet is transferred to a proper station in accordance with the pallet position and operating states of other stacker cranes. The articles of the pallet transferred onto the conveyor at this station are taken out together with the cases from the pallet in an unstacking section 30. In a case flow rack 50, the articles are arranged according to the sorts thereof and temporarily stored. Based on a delivery command, the articles on the case unit that have been taken out of the case flow rack are redisposed to assume an article arrangement on the unit of delivery. The articles are taken out of delivery section 60 via the discharge conveyor unit 13.

As discussed above, according to the present invention, the access ports of the housing section are provided at a plurality of stories. The articles can be therefore efficiently taken in and out, and a utilizing efficiency is also improved.

Further, the conveying means disposed to circulate along the periphery of the housing section are provided corresponding to the plurality of access ports. Improved is a degree of freedom of selecting the access port and the conveying route as well. The articles can be taken in and out more efficiently.

Besides, the horizontal conveying means provided at the plurality of stories are connected through the vertical conveying means. Hence, the degree of freedom of selecting the access port and the conveying route is further ameliorated. The articles can be taken in and out at a much higher efficiency.

In the 3-D warehouse according to the present invention, the bring-in route to the sorting section is multiplexed. It is therefore possible to increase the efficiency of the sorting operation by sharing the roles of the conveyors.

Additionally, in the 3-D warehouse according to the present invention, the discharge route from the sorting section is configured to circulate, thereby improving the discharge efficiency.

Although the illustrative embodiments of the present invention have been described in detail with reference to the accompanying drawings, it is to be understood that the present invention is not limited to those embodiments. Various changes or modification may be effected by one skilled in the art without departing from the scope or spirit of the invention.

What is claimed is:

1. A three-dimensional warehouse comprising:
    a plurality of racks which together form a rack arrangement, each rack defining a plurality of article housing blocks for housing articles;
    a plurality of access stations for providing access for the articles to and from the rack arrangement, at least one of the access stations being located at a first level of the rack arrangement and at least another of the access stations being located at a second level of the rack arrangement different from the first level;
    at least one stacker crane for moving articles between the housing blocks and the access stations; and
    a plurality of horizontal conveying means for conveying articles, one of the horizontal conveying means being arranged adjacent at least one side of the rack arrangement at each of the levels such that the articles can be transferred between each access station and the conveying means.

2. The three-dimensional warehouse according to claim 1, further including:
    a sorting section for sorting the articles removed from the housing blocks; and
    a discharge conveying route for discharging the articles sorted by the sorting section, the discharge conveying route including a circulating route having a return route from a discharge point of the discharge conveying route to the sorting section.

3. The three-dimensional warehouse according to claim 2 wherein the sorting section includes two sorting output parts and a connecting route for connecting ends of each of the output parts.

4. The three-dimensional warehouse according to claim 1, wherein the horizontal conveying means is a belt conveyor.

5. The three-dimensional warehouse according to claim 1, wherein the horizontal conveying means is a roller conveyor.

6. The three-dimensional warehouse according to claim 1, wherein the horizontal conveying means is computer controlled.

7. The three-dimensional warehouse according to claim 1, further including:
    at least one vertical conveying means for moving articles vertically between the horizontal conveying means at the first level to the horizontal conveying means at the second level.

8. The three-dimensional warehouse according to claim 7, wherein each vertical conveying means is positioned at a corner of the rack arrangement.

9. The three-dimensional warehouse according to claim 8, wherein each vertical conveying means is arranged to transfer the articles between two horizontal conveying means adjacent contiguous sides of the rack arrangement.

10. A three-dimensional warehouse comprising:
    a plurality of racks which together form a rack arrangement, each rack defining a plurality of article housing blocks for housing articles;
    a plurality of access stations for providing access for the articles to and from the rack arrangement, at least one of the access stations being located at a first level of the rack arrangement and at least another of the access stations being located at a second level of the rack arrangement different from the first level;

at least one stacker crane for moving articles between the housing blocks and the access stations;

a plurality of horizontal conveying means for conveying articles, one of the horizontal conveying means being arranged adjacent at least one side of the rack arrangement at each of the levels such that the articles can be transferred between each access station and a conveying means;

at least one vertical conveying means for moving the articles vertically between the horizontal conveying means at the first level to the horizontal conveying means at the second level; and control means for determining, based upon the location of a specific article housing block, which of the plurality of access stations will provide a minimum transfer time for transferring the article between that access station and the specific article housing block, and for controlling the horizontal and vertical conveying means such that the article is conveyed to or from that determined access station.

11. The three-dimensional warehouse according to claim 10, further including:

a sorting section for sorting articles removed from the housing blocks; and a discharge conveying route for discharging the articles sorted by the sorting section, the discharge conveying route including a circulating route having a return route from a discharge point of the discharge conveying route to the sorting section.

12. The three-dimensional warehouse according to claim 11 wherein the sorting section includes two sorting output parts and a connecting route for connecting ends of each of the output parts.

13. The three-dimensional warehouse according to claim 10, wherein the horizontal conveying means is a belt conveyor.

14. The three-dimensional warehouse according to claim 10, wherein the horizontal conveying means is a roller conveyor.

15. The three-dimensional warehouse according to claim 10, wherein each vertical conveying means is positioned at a corner of the rack arrangement.

16. The three-dimensional warehouse according to claim 10, wherein each vertical rack is arranged to transfer the articles between two horizontal conveying means adjacent contiguous sides of the rack arrangement.

* * * * *